United States Patent [19]

Shinkai

[11] Patent Number: 4,697,256
[45] Date of Patent: Sep. 29, 1987

[54] OPTICAL DISC PLAYER WITH IMPROVED INITIAL POSITIONING OPERATION

[75] Inventor: Mitsutoshi Shinkai, Kanagawa, Japan

[73] Assignee: Sony Corporation, Tokyo, Japan

[21] Appl. No.: 758,335

[22] Filed: Jul. 24, 1985

[30] Foreign Application Priority Data

Jul. 28, 1984 [JP] Japan .................................. 59-158344

[51] Int. Cl.⁴ ...................... G11B 7/085; G11B 7/095; G11B 21/08
[52] U.S. Cl. ........................................ 369/32; 369/33; 369/46
[58] Field of Search ...................... 369/32, 33, 41, 46, 369/43–45; 358/342, 907; 360/78

[56] References Cited

U.S. PATENT DOCUMENTS

| | | | |
|---|---|---|---|
| 4,138,663 | 2/1979 | Lehureau et al. ...................... | 369/44 |
| 4,443,869 | 4/1984 | Ammon .................................. | 369/41 |
| 4,484,319 | 11/1984 | Koishi et al. ............................ | 369/46 |
| 4,541,083 | 9/1985 | Maeda et al. ........................... | 369/33 |

FOREIGN PATENT DOCUMENTS 0007199 1/1980 European Pat. Off. ............... 369/41
59-178653 10/1984 Japan ..................................... 369/32

*Primary Examiner*—Raymond F. Cardillo
*Assistant Examiner*—Steven R. Garland
*Attorney, Agent, or Firm*—Lewis H. Eslinger; Alvin Sinderbrand

[57] ABSTRACT

An optical disc player employs a counter preset with a preset value representative of 4 times the distance between an initial address position of an optical head block and a desired track address position. The counter decrements the absolute value of the preset value as the optical head block approaches the desired track. The counter value is converted into an analog signal and applied to a tracking driver which drives the optical head block toward the desired track. The absolute value is decremented by 4 each time the optical head is moved by one track spacing.

11 Claims, 8 Drawing Figures

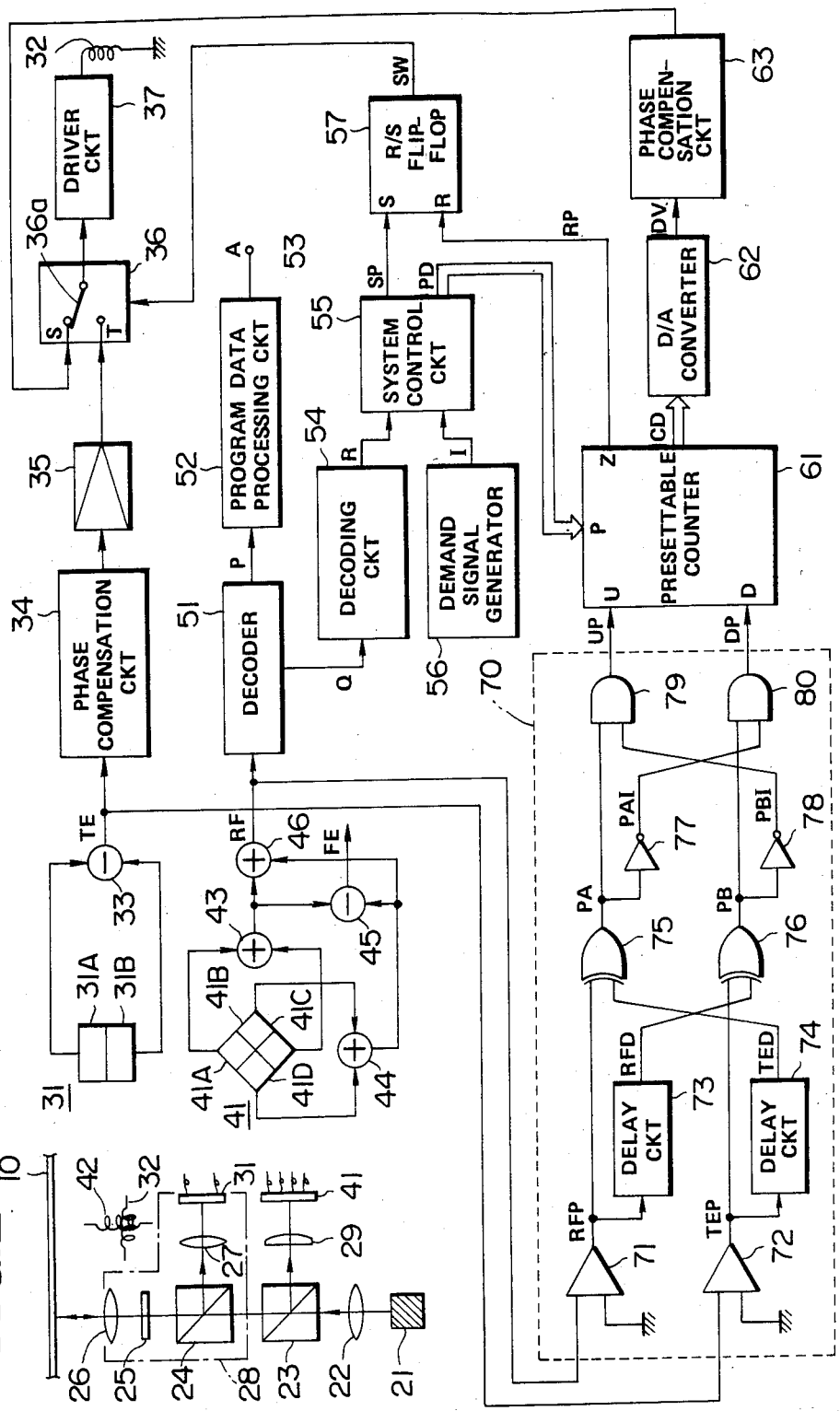

OPTICAL DISC PLAYER WITH IMPROVED INITIAL POSITIONING OPERATION

BACKGROUND OF THE INVENTION

1. Field of the Invention

The present invention relates generally to an optical disc player which records and reproduces data optically by directing an optical beam onto an optical disc. More particularly, the invention relates to an optical disc player which includes a tracking device for moving the optical beam to a desired point on the optical disc in order to record and reproduce arbitrarily selected data.

2. Description of the Prior Art

As is well known, an optical disc has a plurality of tracks arranged spirally or concentrically. In general, the optical disc is adapted to record information, such as digital video signals, digital audio signals or the like, which data will be referred to hereafter as "information" and data representative of track position on the disc, which data will be referred to hereafter as "address data". The address data specifies the position of a track on which the information is recorded or is to be recorded. The optical disc player directs an optical beam towards the track identified by the address data to record or reproduce the data. In other words, the optical beam is targeted at a point corresponding to the desired track and which is identified by the address data.

In order to radially shift the optical beam toward the desired track identified by the addess data, the conventional technique is to move an optical head block housing an optical transmitter directly to a point near the desired track and thereafter move the optical head block repeatedly track-by-track until it reaches the desired track. In practice, in the initial movement, the optical head block is moved to a position on the disc near the desired track but still about 200 tracks away. After reaching this initial position, the optical head block is repeatedly shifted to the next track in the direction of the desired track in response to track-jump signals which trigger a tracking coil in a tracking device.

This conventional optical head block tracking process has the drawback of taking a rather long time to access the desired track. For instance, it may take approximately 1 msec to shift the optical head block to an adjacent track in response to each track-jump signal. Therefore, shifting the optical head block through 200 tracks may take up to approximately 200 msec.

The present invention is intended to significantly shorten the track-search time for an optical disc.

SUMMARY OF THE INVENTION

Therefore, it is an object of the present invention to provide an optical disc player which allows quick access to a desired track.

Another and more specific object of the invention is to provide an optical disc player which allows shifting of an optical head block toward the desired track without the need for a track-jump signal which in conventional systems shifts the optical head block by one track.

A further object of the invention is to provide an optical disc player which controls positioning of the optical head block in an analog manner so as to shorten access time.

In order to accomplish the aforementioned and other objects, an optical disc player, according to the present invention, employs counter means preset with a preset value representative of a distance between an initial address position of an optical head block and a desired track address position. The counter decrements the absolute value of the preset value as the optical head block approaches the desired track. The counter value is converted into an analog signal and applied to a tracking driver which drives the optical head block toward the desired track.

In the preferred process, the absolute value is decremented by 1 (one) for each track crossed by an optical beam.

The present invention continuously shifts the optical head block until it reaches the desired track under analog control mediated by the analog signal derived from the counter value so that the access time to the desired track is significantly shortened.

Furthermore, in the preferred construction, the counter incorporates means for recognizing in which radial direction to the optical head block is moving whereby the absolute counter value can be decremented simply by counting the signed value up or down each time the optical beam crosses one track.

In practice, tracking across about 200 tracks to the desired track would take merely 20 msec in an optical disc player employing the invention. Therefore, the invention reduces the desired track access time (tracking period) to 1/10 that of a conventional player.

According to one aspect of the invention, a tracking system in an optical disc player comprises an optical means for transmitting an optical beam onto one of a plurality of tracks on an optical disc, a tracking system associated with the optical means for controlling the radial position of the latter to a desired track position, and a tracking controller electrically controlling operation of the tracking system, the tracking controller producing a distance signal for controlling an initial positioning operation of the tracking system by which the optical means is moved to the desired track position, the tracking controller including a counter in which an initial value corresponding to the distance btween an initial position of the optical means and the desired track position is set, a pulse generator means for detecting movement of the optical means across a track and reducing the counter value toward zero by a given number each time the optical means moves across a track, and a control signal generator producing an analog control signal with a signal level related to the value in the counter.

According to another aspect of the invention, a process for tracking in an optical disc player including an optical means for transmitting an optical beam toward an optical disc having a plurality of tracks and receiving a reflected light from the optical disc, a tracking system associated with the optical means for radially shifting the optical means to one of tracks on which data is to be recorded, in which a method for tracking the optical means comprises steps of:

detecting an initial track position of the optical means and producing an initial position indicative signal;

receiving an input representative of a desired track position to produce a desired position indicative signal;

deriving a difference between the initial track position indicative signal value and the desired track position and setting an initial counter value corresponding the difference;

driving the tracking system to continuously and radially shift the optical means toward the desired position from the initial position;

reducing the counter value at a given value everytime the optical means shifts across an intervening track existing between the initial track position and the desired track position; and stopping radial shifting of the optical means when the counter value becomes zero.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings:

FIG. 1 is a schematic block diagram of a tracking system of an optical disc player in accordance with the present invention;

FIG. 2 is a diagram of an optical system employed in the preferred embodiment of the optical disc player;

DESCRIPTION OF THE PREFERRED EMBODIMENT

Figure 3:
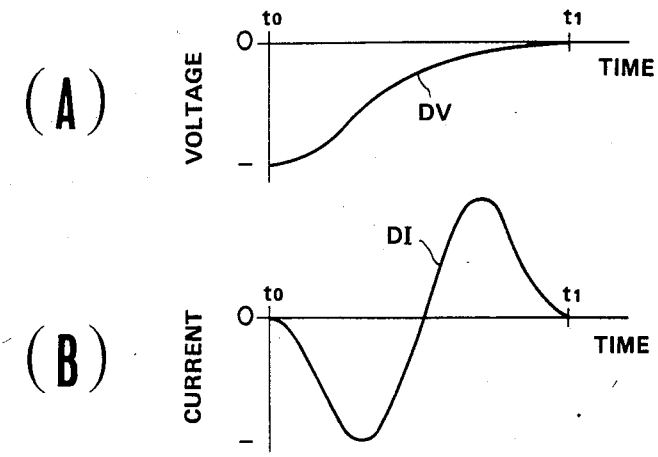
FIGS. 3A and 3B are graphs of an analog signal voltge output by an D/A converter employed in the tracking system of FIG. 1, and the current through a tracking drive coil in the tracking system of FIG. 1 respectively.

Referring now to the drawings, particularly to FIGS. 1 and 2, the preferred embodiment of an optical disc player with a tracking system, according to the invention is designed to record information on a track of an optical disc 10 (FIG. 2) or reproduce information recorded on the disc. The preferred embodiment of the optical disc player is applicable to an optical disc with spiral or concentric tracks preprogrammed with information impressed by means of an optical beam modulated according to the information to be recorded. The present invention is also applicable to optical disc players which can record information such as digital video signals, digital audio signals or the like by irradiating tracks formed on the disc surface with an optical beam modulated according to the information to be recorded. The optical disc also has tracks differing from the information tracks which serve to record address data.

As shown in FIG. 2, the optical system employed in the preferred embodiment of the optical disc player has a laser beam source 21. The laser beam source 21 produces an optical beam modulated in accordance with information to be recorded on the optical disc, or to produce an optical beam of constant intensity when information prerecorded on the optical disc is to be reproduced or read out. The optical beam produced by the laser beam source 21 passes through a collimating lens 22, two polarizing beam splitters 23 and 24, ¼ wave plate 25 and finally an objective lens 26. The objective lens focuses the optical beam onto the surface of the optical disc.

Light reflected from the optical disc surface is received by the objective lens 26 and passes through the ¼ wave plate, and the polarizing beam splitters 24 and 23. The polarizing beam splitter 24 sends part of the reflected light to a tracking error sensor 31 via a lens system 27. The tracking error sensor 31 is designed to detect tracking error and is separated into two active sections as explained later. The remaining reflected light reaching the polarized beam splitter 23 is passed to a reflected light sensor 41 through a lens system 29. The reflected light sensor 41 is designed to detect focus error and is separated into four active sections as explained later.

The polarizing beam splitter 24, ¼ wave plate, 25, objective lens 26, the lens system 27 and tracking error sensor 31 form an optical head block 28. The optical head block 28 is mounted for both radial and axial movement. A tracking driver coil 32 is provided for radially shifting the optical head block 28 in response to a tracking error signal. A focus driver coil 42 is provided for axially driving the optical head block in response to a focus error signal.

As shown in FIG. 1, the tracking error sensor 31 has a first and second detector sections 31A and 31B. The first and second detector sections 31A and 31B independently monitor the intensity of reflected light and output signals indicative thereof. The first and second detector sections 31A and 31B are connected for output to a subtracting circuit 33. The subtracting circuit 33 derives a tracking error signal TE by finding the difference between the outputs of the first and second detector sections.

Similarly, the reflected light sensor 41 is made up of first, second, third and fourth detector sections 41A, 41B, 41C and 41D arranged in a 2×2 array. The first and third detector sections 41A and 41C diagonally opposed in the array of the detector 41. Similarly, the second and fourth detector sections 1B and 1C form the other diagonal pair of the detector 41. The first to fourth detector sections 41A, 41B, 41C and 41D independently produce signals representative of the intensity of the incident light from beam splitter 23. The two detector sections 41A and 41C are connected for output to an adder 43. Similarly, the detector sections 41B and 41D are connected for output to another adder 44. The adder 43 sums the input values from the detector sections 41A and 41C to derive its output and the adder 44 sums the input values from the detector sections 41B and 41D to derive its output. The adders 43 and 44 are connected for output to a subtractor 45, which derives a focus error signal FE by finding the difference between the sum values of the adders 43 and 44. The adders 43 and 44 are also connected for output to an adder 46. The adder 46 sums the input values from the adders 43 and 44 to derive its output. The output of the adder 46 is representative of total intensity of the reflected optical beam. This output of the adder 46 serves as a reproducted data signal when prerecorded information on the optical disc 10 is to be reproduced. The ouptut of the adder 46 will be referred to hereafter as "reflected beam intensity indicative signal RF" or simply "reflect signal RF".

The subtractor 33 is connected to a switching terminal T of a switching circuit 36 via a phase compensation circuit 34 and an amplifier 35. When a movable switch element 36a is in contact with the terminal T, the tracking error signal TE transmitted through the phase compensation circuit 34 and the amplifier 35 is input to the tracking driver coil 32 via a driver circuit 37. Thus, a tracking-servo loop is completed.

Although it has not been illustrated in the drawings, the subtractor 45 is also connected for output to a switching circuit via a phase compensation circuit and an amplifier, and the switching circuit is, in turn, connected to the focus driver coil 42 via a driver circuit. Therefore, the focus error signal is applied to the focus driver coil 42 via the phase compensation circuit, the amplifier, switching circuit and the driver circuit to form a focus-servo loop.

The adder 46 is connected for output to a decoder 51. The decoder 51 derives reproduction address data Q identifying a track on the optical disc 10, on the basis of the reflect signal RF from the adder 46, when information is to be recorded on the disc 10. On the other hand, when prerecorded information is to be reproduced, the decoder 51 derives the reproduction address data Q and program data P on the basis of the reflect signal RF from the adder 46. The program data P derived by the decoder 51 is fed to a program data processing circuit 52. The program data processing circuit 52 derives a reproduced program signal A on the basis of the program data P and outputs the signal A through an output terminal 53. The reproduced program signal A is the desired reproduced video or audio signal or the like.

The decoder 51 is also connected for output to a deocding circuit 54 to which it supplies the reproduction address data Q. The decoding circuit 54 processes the address data Q from the recorder 51 to derive position data R which is indicative of the current optical beam position on the optical disc 10. The decoding circuit 54 sends the position data R to a system control circuit 55. A demand signal generator 56 is also connected to the system control circuit 55. The demand signal generator 56 incorporates means for identifying the track on the optical disc 10 to be accessed. The demand signal generator 56 produces a track address indicative signal I representative of the address of the track to be accessed. The value of the track address indicative signal will be referred to hereafter as "desired track address data I". The desired track address data I is fed to the system control circuit 55.

The system control circuit 55 processes the position data R and the desired track address data I to derive the positioned relationship between current track position of the optical head block 28 and the destination track. Specifically, the system control circuit 55 determines the direction and magnitude through which to shift the optical head block on the basis of the position data R and the desired track address data I. The system control circuit 55 produces a shift-start pulse SP and sends the shift-start pulse SP to a reset/set (R/S) flip-flop 57. The set input terminal of R/S flip-flop 57 is connected for input from the system control circuit 55. Therefore, the R/S flip-flop 57 is set by the shift-start pulse SP from the system control circuit to output a HIGH-level switching signal SW. The switching signal SW from the R/S flip-flop 57 causes the the switching circuit 36 to switch the position of the movable switch element 36a to the terminal S as shown in FIG. 1.

The system control circuit 55 also derives preset distance data PD which is representative of the distance in terms of disc tracks between the initial track position of the optical head block 28 represented by the position data R and the track to be accessed represented by the desired track address data I. The system control circuit 55 outputs the preset distance data PD to a terminal P of a presettable counter 61. The presettable counter 61 responds to the preset distance data PD from the system control circuit 55 by presetting its count to an initial value corresponding to the preset distance data value. The output terminal of the counter 61 connected supplies a counter value indicative signal CD to a digital-to-analog (D/A) converter 62. The D/A converter 62 converts the counter value indicative signal CD into an analog signal with a voltage related to the counter value. The analog signal representative of the counter value and thus representative of the overall distance to be travelled by the optical head block 28, will be referred to hereafter as "distance signal DV". The distance signal DV is conducted to the terminal S of the switching circuit 36 via a phase compensation circuit 63. While the switching element 36a of the switching circuit 36 is in contact with the terminal S, the distance signal from of the D/A converter 62 is applied to the tracking driver coil 32 through the switching circuit 36 and the driver circuit 37. The tracking driver coil 32 is energized by the distance signal DV to drive the optical head block toward the desired track.

If the desired track to be accessed is located radially inside of the current optical head block position, the preset value of the presettable counter will be a negative value, the absolute value of which corresponds to the number of tracks on the disc 10 between the initial optical head block position and the desired track. Conversely, if the optical head block 28 resides inside of the desired track, thus requiring radially outward movement of the optical head block, the preset value in the presettable counter 61 will be a positive value, the absolute value of which represents the number of tracks between the initial optical head block position and the desired track.

In order to preset both the distance and the radial direction in the presettable counter, the system control circuit derives the polarity of the preset distance data PD. For instance, when the desired track lies inside of the initial optical head block position, the distance will have a negative value corresponding to the number of tracks between the initial optical head block position and the desired track position. Conversely, when the desired track lies outside of the optical head block position, then, the distance will have a positive value corresponding to number of tracks between the initial optical head block position and the esired track position.

Figure 4:
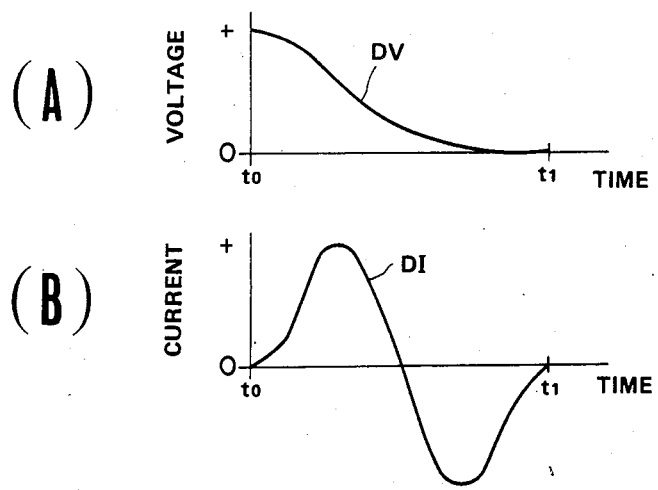
FIGS. 4A and 4B are graphs similar to FIGS. 3 for the case of head positioning in the direction opposite to that of FIGS. 3.

FIGS. 3A and 4A show how the distance signal voltge DV from the D/A converter changes with time. As will be appreciated from FIG. 3A, when the initial counter value is negative, the initial voltage DV output by the D/A converter 62 will be negative and will have an absolute value corresponding to that of the negative counter value. Conversely, when the preset counter value is positive, the initial voltage DV is positive and corresponds to the absolute distance between the optical head block and the desired track, as shown in FIG. 4A. Depending upon the polarity of the distance signal DV from the D/A converter 62 applied through the phase compensation circuit 63, the switching circuit 36 and the driver circuit 37, the tracking driver coil 32 drives the optical head block in one direction or the other. For instance, the tracking driver coil 32 is responsive to a negative distanced signal DV to shift the optical block radially inward, and conversely the tracking driver coil 32 drives the optical head block radially outward in response to a positive distance signal.

The reflect signal RF from the adder 46 and the tracking error signal TE of the subtractor 33 are also fed to a pulse generator circuit 70.

The reflect signal value RF varies such that:

when the optical beam falls just at the center of a track on the disc 10, the value of the reflect signal RF is maximized; and when the optical beam falls midway between two tracks, the value of the reflect signal RF is minimized.

Figure 5:
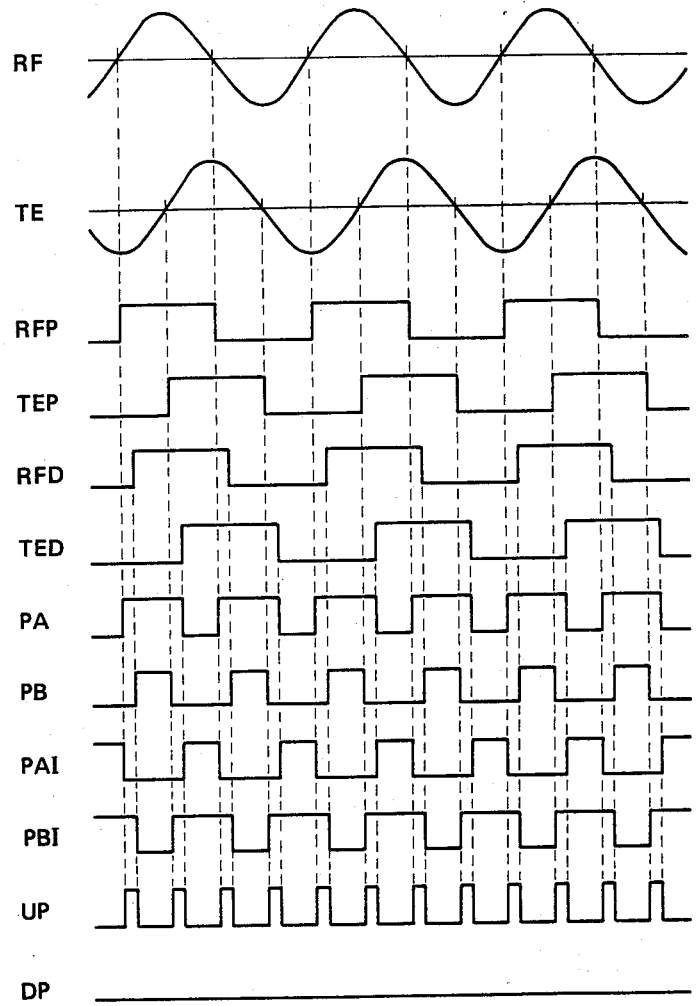
FIGS. 5 and 6 are timing charts for the output signals of various elements in the tracking system of FIG. 1.
Figure 6:
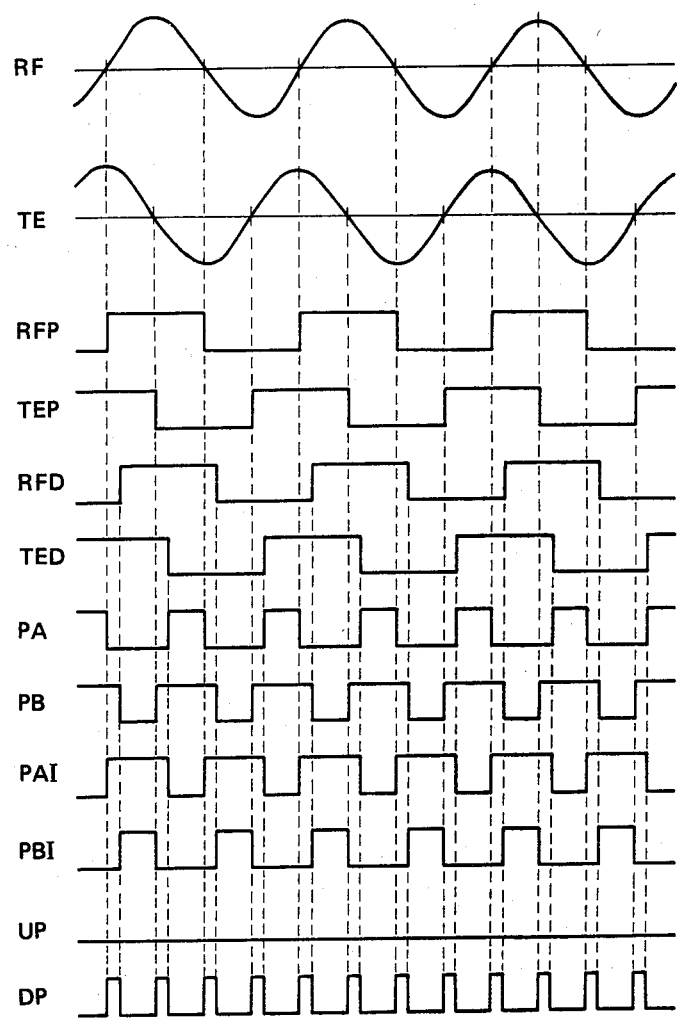

Therefore, while the optical head blocks 28 is moving radially across the optical disc 10, the value of the reflect signal RF varies cyclically between its maximum and minimum values, as shown in FIGS. 5 and 6.

Similarly, the tracking error signal value TE varies depending upon the beam position relative to each track in the same manner as set forth with respect to the reflect signal RF. The phase of the tracking error signal TE is offset to a given extent from that of the reflect signal RF a given magnitude. In the shown embodiment, the phase shift is ±90°. For instance, when the optical head block 28 is moving radially inward, the phase of the tracking error signal TE is delayed by 90° relative to the phase of the reflect signal RF. Conversely, when the optical head block 28 is moving radially outward, the phase of the tracking error signal TE is advanced by 90° relative to the reflect signal RF. FIGS. 5 and 6 illustrate this relationship between the phases of the tracking error indicative signal TE and the reflect signal RF. FIG. 5 shows the case in which the phase of the tracking error signal TE is delayed by 90° relative to the reflect signal RF as the optical head block 28 moves outward.

Taking advantage of the aforementioned phase relationship between the tracking error signal TE and the reflect signal RF, the pulse generator circuit 70 outputs pulses through a first output terminal (UP) each time the optical head block shifts inwards across a track. The number of pulses output in response to each track crossing is constant. Conversely, the pulse generator 70 outputs a given number of pulse through a second output terminal (DOWN) each time the optical head block 28 shifts outwards past a track. In practice, the pulse generator circuit 70 is designed to produce pulses at every zero-crossing point of both the tracking error signal TE and the reflect signal RF, as shown in FIGS. 5 and 6.

In order to perform the foregoing operation, the pulse generator circuit 70 includes voltage comparators 71 and 72. The comparator 71 is connected for input from the adder 46 to receive the reflect signal RF, and the comparator 72 is connected for input from the subtractor 33 to receive therefrom the tracking error signal TE. The comprators 71 and 72 reshape the waveforms of the reflect signal RF and the tracking error signal TE and output rectangular-wave pulse signals RFP and TEP respectively. As will be appreciated from FIGS. 5 and 6, the rectangular-wave signal REP goes HIGH at the positive-going zero-crossing points of the reflect signal RF, and goes LOW at the negative-going zero-crossing points of the reflect signal RF. Similarly, the rectangular-wave signal TEP goes HIGH at the positive-going zero-crossing points of the tracking error signal TE, and goes LOW at the negative-going zero-crossing points of the tracking error signal.

The rectangular-wave signals RFP and TEP are output to respectively corresponding delay circuits 73 and 74. The delay circuit 73 delays the rectangular-wave signal REP from the comparator 71 by a given relatively short period and outputs a delayed signal RFD. Similarly, the delay circuit 74 delays the rectangular-wave signal TEP from the comparator 72 by a given relatively short period and outputs a delayed signal TED.

The comparators 71 and 72 are also connected for output to exclusive OR's 75 and 76. The delay circuits 73 and 74 are also connected for output to the exclusive OR's 75 and 76. As shown in FIG. 1, the delay circuit 73 is connected to the exclusive OR 76 which also receives the signal TEP from the comparator 72. Similarly, the delay circuit 74 is connected to the exclusive OR 75 which also receives the signal RFP from the comparator 71. The exclusive OR 74 outputs a HIGH-level phase signal PA as long as exactly one of the rectangular-wave signal RFP or delayed signal TED remains HIGH and the other remains LOW. Similarly, the exclusive OR 76 outputs a HIGH-level phase signal PB as long as exactly one of the rectangular-wave signal TEP and the delayed signal RFD remains HIGH and the other is LOW. The phase signals PA and PB are pass through espectively corresponding inverters 77 and 78, which output inverted phase signals PAI and PBI. The inverter 77 is connected for output to an AND gate 80 which is also connected for input from the exclusive-OR gate 76 to receive the phase signal PB. Similarly, the inverter 78 is connected for output to an AND gate 79 which is also connected for input from the exclusive-OR gate 75 to receive the phase signal PA. The AND gate 79 is connected for output to an up-count input terminal U of the presettable counter 61 via the first output terminal UP. Similarly, the AND gate 80 is connected for output to a down-count input D of the presettable counter 61 via the second output terminal DP.

The presettable counter 61 responds to the pulses from the first output terminal UP by incrementing its value so as to reduce the absolute value of a negative preset value. On the other hand, the presettable counter 61 responds to pulses from the second output terminal DP by decrementing its value so as to reduce the absolute value of a positive preset value.

As shown in FIG. 5, as the optical head block 28 moves radially inwards, the phase signal PA and the inverted phase signal PBI inputted to the AND gate 79 satisfy AND condition at every zero-crossing point of the reflect signal RF and the tracking error signal TE. Therefore, 4 pulses are input to the presettable counter 61 every time the optical beam crosses a track. As a result, the negative preset value in the presettable counter 61 is reduced by 4 every time the optical head block moves inwards through one track spacing. In this case, since the polarities of the phase signal PB and the inverted phase signal PAI are always opposed, the output from the AND gate 80 through the second output of the pulse generator 70 remains LOW. Therefore, the absolute value of the presettable counter 61 never increases.

In case where the optical head block 28 is moving outwards, the AND condition of the AND gate 80 is satisfied at every zero-crossing point of the reflect signal RF and the tracking error signal TE. Thus 4 pulses are input to the down-count terminal D of the presettable counter 61 through the second output DP of the pulse generator circuit 70 every time the optical head block shifts across a track. Therefore, the positive preset value of and presettable counter 61 is decremented by 4 whenever the optical beam crosses a track. In this case, as shown in FIG. 6, the polarities of the phase signal PA and the inverted phase signal PBI are always opposed, the output of the AND gate 79 through the first output terminal UP of the pulse generator circuit 70 remains LOW.

In summary, the presettable counter 61 is preset to a negative value when the optical head block 28 is to move inwards towards the desired track, in which case the counter value of the presettable counter 61 is increased toward zero as the optical head block crosses each track. The optical head block 28 will oppose the desired track when the counter value of the persettable counter 61 equals zero. Thus the optical head block 28 is shifted until the emergence of a reset pulse produced by the presettable counter 61. The reset pulse RP is applied to a reset input R of the R/S flip-flop 57 to reset the latter. When the flip-flop 57 is reset, the switching signal SW from the flip-flop 57 goes LOW. In response to the LOW-level switching signal, the switching circuit 36 moves the switching element 36a into contact with the terminal T to establish the tracking-servo loop for normal tracking operations.

Similarly, when the optical head block 28 is to move outwards to the desired track, the presettable counter 61 is initially set to a positive value. The positive counter value is decremented by the pulses DP from the pulse generator circuit 70 whenever the optical head block shifts across a track. Therefore, as when shifting to the inside, the counter value approaches zero as the head block approaches the desired track.

When the optical head block reaches the desired track, the counter value of the presettable counter 61 becomes zero. At this time, the reset signal RP is output through the output terminal Z of the presettable counter 61 to reset the R/S flip-flop 57. As a result, the switching signal SW applied to the switching circuit 36 goes LOW, causing the switch element position to connect the terminal T to the tracking driver coil 32 so as to establish the normal tracking-servo loop.

As the optical head block moves to the desired track position, the electric current DI through the tracking driver coil 32 varies as illustrated in FIGS. 3B and 4B. As will be appreciated herefrom, if the voltage DV of the distance signal DV from the D/A converter is negative, the initial current applied to the tracking driver coil is negative. Conversely, if the voltge of the distance signal DV is positive, the initial current applied to the tracking driver coil 32 is positive, as shown in FIGS. 4A and 4B. In both cases, the current DI increases in magnitude sharply as the optical head accelerates from rest. The current intensity is then decreases until it crosses to the other polarity about halfway through the search process. The optical head then decelerates as the driving current DI increases in the opposite direction. As the optical head approaches the desired track, the current DI is returned again to a near-zero level.

In should be noted that, in FIGS. 3A and 3B and 4A and 4B, the time points and $t_1$ represents the timing of the beginning and end respectively of the desired track search process described above.

It should be appreciated that, although in the shown embodiment, the tracking operation moves the optical head block exactly to the desired track, it would be possible to stop the optical head block at a position several tracks away from the desired track. In this case, fine adjustment would be performed by triggering the tracking driver coil 32 with the conventional track-jump signal to shift the optical head block toward the desired track track-by-track. In this case, the R/S flip-flop 57 may be reset when the absolute value of the counter value of the presettable counter 61 becomes less than a predetermined value greater than zero.

In summary, the present invention which has been described in detail in terms of the preferred embodiment, satisfactorily and successfully shortens the time required for initial positioning of the optical head opposite the desired track. In experiments performed by the applicant, the initial positioning can be completed in about 20 msec, which is about 1/10 of the time required by conventional processes.

While a specific embodiment has been disclosed in order to clearly describe the present invention, the invention should not be considered to be limited to the specific embodiment. All possible modifications and embodiments which do not depart from the principle of the invention as recited in appended claims should be understood as falling within the scope of the invention.

What is claimed is:

1. An optical disc player for playing an optical disc having a recording surface with a plurality of tracks, comprising:

optical means for transmitting an optical beam onto one of said plurality of tracks on said optical disc and receiving a reflected signal therefrom;

a tracking system associated with said optical means for controlling the radial position of the latter to a desired track position at which said beam impinges upon a desired track, said tracking system receiving a reflected beam from said optical disc and producing first and second output signals indicative of a position of said beam on said surface and varying cyclically between respective maximum and minimum values as said optical means is moved from one track position to an adjacent track position;

a tracking controller electrically controlling operation of said tracking system, said tracking controller producing a distance signal for controlling an initial positioning operation of said tracking system by which said optical means is moved to any desired track position from an initial track position, said tracking controller including a counter in which an initial counter value corresponding to four times the number of tracks between said initial position of said optical means and said desired track position is preset at the start of said initial positioning operation;

pulse generator means for detecting movement of said optical means across a track in response to said first and second output signals and producing a pulse each time each of said first and second output signals has a predetermined value intermediate said respective maximum and minimum values to produce four pulses each time said optical means moves through one track spacing;

said counter receiving said pulses and reducing said counter value towards zero by 4 each time said optical means moves through one track spacing; and a control signal generator producing an analog control signal with a signal level proportional to said counter value, said control signal being supplied to said tracking system during said initial positioning operation thereof.

2. The optical disc player set forth in claim 1, wherein said tracking controller is associated with first means for detecting an initial track position for producing a first signal value indicative thereof and second means for inputting a desired track position and producing a second signal value indicative thereof, and said tracking controller derives said initial counter value on the basis of said first signal value and said second signal value.

3. The optical disc player as set forth in claim 1, wherein said tracking controller includes switching means adapted for switching an operation mode of said tracking system between a track-jump mode in which a track-jump signal is provided to said optical means to move the same from one track position to an adjacent track position and an initial set mode in which said optical means receives said control signal and is continuously moved toward the desired track position until said counter value reaches zero.

4. The optical disc player as set forth in claim 3, wherein said tracking controller operates said switching means at a first switch position corresponding to said initial set mode of said tracking system while said optical means is to be initially set to the desired track position, and switches and switch position to a second switch position corresponding to said track-jump mode of the tracking system when said counter value reaches zero.

5. The optical disc player as set forth in claim 4, which further comprises a first and a second reflected light sensor, each of which is adapted to monitor reflected light intensity and produces sensor signal indicative thereof, and said tracking controller is associated with said first and second sensors for receiving first and second sensor signals therefrom, and detects radial direction to which said optical means moves in said initial set mode on the basis thereof.

6. The optical disc player as set forth in claim 5, wherein said first sensor signal produced by said first reflected light sensor is used in said track-jump mode of said tracking system.

7. In an optical disc player for playing an optical disc having a plurality of tracks and including optical means for transmitting an optical beam toward said optical disc and receiving a reflected light beam from said optical disc, a tracking system associated with said optical means for radially shifting said optical means to a track position at which said optical beam impinges on one of said tracks on which said data is to be recorded, and producing first and second output signals indicative of a position of said beam on said surface and varying cyclically between respective maximum and minimum values as said optical means is moved from one track position to an adjacent track position in which a method for tracking control of said optical means comprises the steps of;
   detecting an initial track position of said optical means and producing an initial track position indicative signal;
   receiving an input representative of a desired track position to produce a desired position indicative signal;
   deriving a difference corresponding to 4 times the number of tracks between the track position indicated by said initial track position indicative signal and the track position indicated by said desired position indicative signal and setting an initial counter value corresponding to said difference;
   driving said tracking system to continuously radially shift said optical means toward said desired position from said initial position;
   detecting each time each of said first and second output signals has a predetermined value intermediate said respective maximum and minimum values;
   reducing said counter value in response to each said detection as said optical means shifts between said initial track position and said desired track position; and
   stopping radial shifting of said optical means when said counter value becomes zero.

8. The method as set forth in claim 7, which further comprises the steps of;
   providing a first reflected light sensor for producing said first output signal as a first sensor signal indicative of reflected light intensity;
   providing a second reflected light sensor for producing said second output signal as a second sensor signal indicative of reflected light inetnsity, said second sensor signal being shifted in signal phase with respect to said first sensor signal; and
   detecting the radial direction in which said optical means is shifted in response to said first and second sensor signals.

9. The method as set forth in claim 8, which further comprises the steps of:
   deriving a radial shifting direction of said optical means on the basis of said initial position indicative signal and said desired position indicative signal; and
   deriving a polarity of said initial counter value depending upon the direction toward which said optical means is to be shifted.

10. The method as set forth in claim 9, wherein said step of producing said counter value is performed by incrementing or decrementing said counter by 4 each time a distance of one track spacing is moved to reduce an absolute value of said counter value to zero.

11. The method as set forth in claim 10, which further comprises the steps of:
   providing a track-jump mode in which said optical means is radially shifted to adjacent track in in one-by-one fashion in response to a track-jump signal, and an initial set mode in which said continuous shifting of said optical means until the latter reaches said desired position;
   selecting said initial set mode when said optical means is to be initially set to said desired position; and
   selecting said track-jump mode after initially setting said optical means to said desired position and in response to the counter value reaching zero.

* * * * *